O. Barr,

House Ventilator.

No. 101,972. Patented Apr. 19, 1870.

Witnesses,
J. L. Coburn
Henri Bruns

Inventor,
Orland Barr
by L. L. Coburn atty.

UNITED STATES PATENT OFFICE.

ORLANDO BARR, OF BELOIT, WISCONSIN.

VENTILATOR.

Specification forming part of Letters Patent No. 101,972, dated April 19, 1870.

*To all whom it may concern:*

Be it known that I, ORLANDO BARR, of Beloit, in the county of Rock and State of Wisconsin, have invented a new and useful Improvement in Ventilators; and I do hereby declare the following to be a full, clear, and exact description of the same, reference being had to the accompanying drawings, and the letters and figures marked thereon, which form a part of this specification, and in which—

Figure 1:
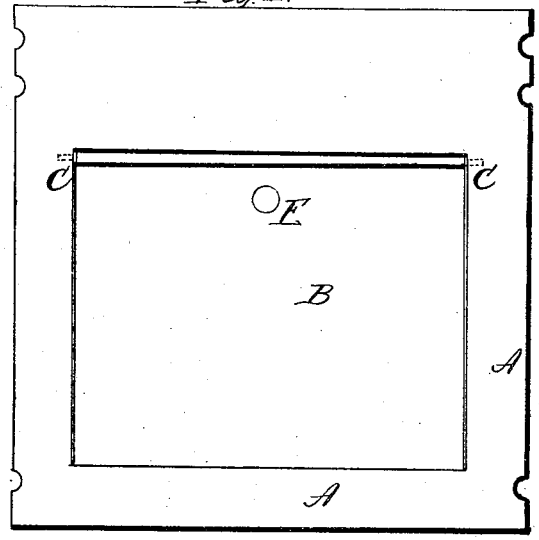
Figure 2:
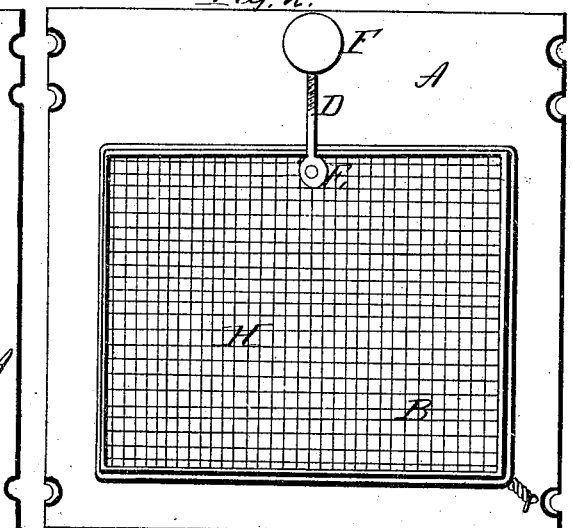
Figure 3:
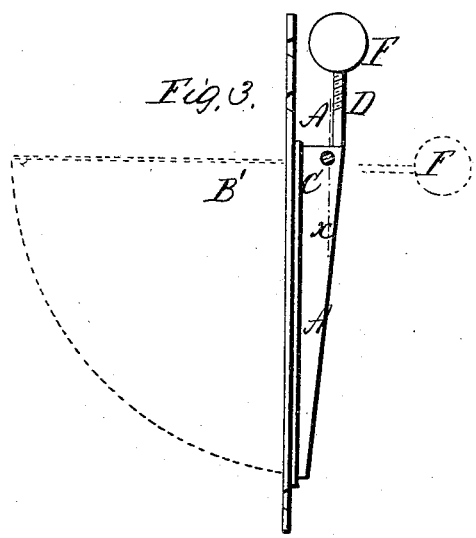
Figure 4:
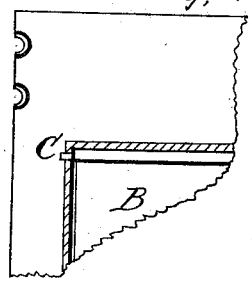

Figure 1 represents a front elevation of my ventilator with the valve closed; Fig. 2, a rear elevation of the same; Fig. 3, an edge view thereof, showing the valve open in dotted lines; and Fig. 4, a sectional view at the line $x$ of a portion of the ventilator.

The nature of my invention consists in the combination of a pivoted valve and a weight in a ventilator, so adjusted that the weight will cause the valve to open and close automatically, as hereinafter described; and it further consists in hanging said valve on a thin or knife-edge bearing, for the purpose of avoiding friction, so that the valve will the more readily act automatically.

To enable those skilled in the art to understand how to manufacture and use my invention, I will proceed to describe the same with particularity.

The same letters of reference refer to the corresponding parts in the different figures.

In the annexed drawings, A represents the ventilator-frame, which I ordinarily make of cast-iron, and it is of such size and shape as will fit an ordinary window-sash in place of one of the panes of glass. There is a valve, B, pivoted in the frame A in such a way that it will swing and open or close the ventilator automatically, as hereinafter described. In the annexed drawings the valve is pivoted in the frame A at C C. There is a rod, D, attached to the valve B at E, and there is a weight, F, suspended upon the rod D in such a manner as to serve as a counter-balance to the valve. The weight F may be screwed up on the rod D, as shown, so as to be adjustable, for the purpose of regulating it as a counter-balance, the weight being on one side of the frame and the valve swinging out on the opposite side of the frame when it opens. The pivoting-pins rest at C upon a sharp edge for a bearing, as clearly shown in Fig. 4, so that they will turn thereon with less friction. I place a wire screen, H, over the opening in the frame, so that the opening in the ventilator is still covered with the screen when the valve is open, and insects are kept out when the air is admitted.

I design my ventilator more particularly for cellars, and I place one or more of them upon opposite sides thereof, in the sash which admits light, so that when the wind blows from one direction the ventilators on one side of the cellar are open and those on the opposite side are closed. When the wind changes, the open ventilators close and the closed ones open, so that in whatever direction the wind may be blowing there is always ventilation to the cellar, and still never a current of air passing through it. The weights on the valves enable me to balance them, so that they open and close automatically as the wind changes, which avoids any trouble or attention.

To prevent any doubt or misconception as to the construction of my invention, and especially as to the manner of pivoting the valve B, I will proceed more fully and exactly to describe the same. The valve B is pivoted to the frame A, so that if the ventilator were to be constructed with mathematical accuracy there would be a line of rest through it from pivot to pivot, coinciding with the center of the pivots, and coinciding also with the axis of an imaginary cylinder described by the free edge of the valve B, supposing it could be swung completely around upon the pivots. This line of rest running through the valve would be motionless always.

The advantage of my invention over ordinary ventilators is its extreme simplicity of construction; also, the fact that it takes but a very slight current of air to open or close it, owing to the valve being pivoted upon knife-edged axles; also, above all, that it is completely and entirely automatic, being closed and opened by the air itself.

Having thus fully described the construction and operation of my improved ventilator, what I claim as new, and desire to secure by Letters Patent, is—

1. The combination, in a ventilator, of the valve B, pivoted, in the manner substantially as described, to the frame A, and having a weight attached, so constructed and arranged that the weight balances the valve upon its pivots, and causes it to operate automatically, substantially as and for the purpose specified.

2. Hanging the weighted valve B upon a sharp-edge bearing to prevent friction, substantially as shown and described.

ORLANDO BARR.

Witnesses:
L. L. COBURN,
HEINR. BRUNS.